United States Patent
Oliva Elorza et al.

(10) Patent No.: US 10,820,131 B1
(45) Date of Patent: Oct. 27, 2020

(54) METHOD AND SYSTEM FOR CREATING BINAURAL IMMERSIVE AUDIO FOR AN AUDIOVISUAL CONTENT

(71) Applicant: Turku University of Applied Sciences Ltd, Turku (FI)

(72) Inventors: David Oliva Elorza, Turku (FI); Pertti Ranttila, Salo (FI)

(73) Assignee: Turku University of Applied Sciences LTD, Turku (FI)

( * ) Notice: Subject to any disclaimer, the term of this patent is extended or adjusted under 35 U.S.C. 154(b) by 0 days.

(21) Appl. No.: 16/590,627

(22) Filed: Oct. 2, 2019

(51) Int. Cl.
| H04S 5/00 | (2006.01) |
| G06K 9/00 | (2006.01) |
| G06N 20/00 | (2019.01) |

(52) U.S. Cl.
CPC ............ *H04S 5/00* (2013.01); *G06K 9/00744* (2013.01); *G06N 20/00* (2019.01); *H04S 2400/11* (2013.01); *H04S 2400/13* (2013.01)

(58) Field of Classification Search
CPC ..... H04S 5/00; H04S 5/04; H04S 5/02; H04S 2400/11; H04S 2400/13; H04S 1/002; H04S 1/00; H04S 1/007; H04S 3/00; H04S 7/301; H04S 7/302; H04S 7/304; H04S 2400/01; G06N 20/00; G06K 9/00744; H04R 3/12; H04R 5/02; H04R 2499/15; H04N 5/642; G06F 1/1605
USPC ...................................... 381/1, 306, 303, 310
See application file for complete search history.

(56) References Cited

U.S. PATENT DOCUMENTS

| 6,184,937 | B1 | 2/2001 | Williams et al. |
| 7,876,914 | B2 | 1/2011 | Grosvenor et al. |
| 2003/0053680 | A1* | 3/2003 | Lin .................. H04S 5/005 382/154 |
| 2012/0154632 | A1 | 6/2012 | Ota |
| 2016/0192073 | A1 | 6/2016 | Poomachandran et al. |
| 2019/0073553 | A1* | 3/2019 | Yao ..................... G06K 9/46 |

(Continued)

FOREIGN PATENT DOCUMENTS

| WO | 2009117450 A1 | 9/2009 |
| WO | 2011002729 A1 | 5/2011 |

(Continued)

OTHER PUBLICATIONS

Godard et al "Unsupervised Monocular Depth Estimation with Left-Right Consistency" XP055601453, DOI: 10.1109/CVPR.2017.699, Retrieved from URL: https://arxiv.org/abs/1609.03677, Apr. 12, 2017, 14 Pages.

(Continued)

*Primary Examiner* — Ahmad F. Matar
*Assistant Examiner* — Sabrina Diaz
(74) *Attorney, Agent, or Firm* — Ziegler IP Law Group, LLC

(57) ABSTRACT

A method and system for creating binaural immersive audio for an audiovisual content. The method includes steps of receiving the video and the audio; selecting at least one frame of the video; analyzing the selected frame of the video to identify audio contributing object within the frame; analyzing at least one portion of the audio; associating the analyzed audio with the corresponding identified audio contributing object within the frame; using the association to generate the binaural audio for the audiovisual content.

18 Claims, 6 Drawing Sheets

(56) References Cited

U.S. PATENT DOCUMENTS

2019/0306451 A1* 10/2019 Wang .................. H04S 7/30

FOREIGN PATENT DOCUMENTS

| WO | 2012145176 A1 | 10/2012 |
|----|---------------|---------|
| WO | 2019104229 A1 | 5/2019  |

OTHER PUBLICATIONS

Notification of Transmittal of The International Search Report and The Written Opinion of the International Searching Authority, or the Declaration, Application No. PCT/EP2020/070252, dated Aug. 12, 2020, 14 Pages.

Pritish et al "Monoaural Audio Source Separation using Deep Convolutional Neural Networks" Springer International Publishing AG, Feb. 15, 2017, DOI: 10.1007/978-3-319-53547-0_25, pp. 258-266, 10 Pages.

Rouditchenko et al. "Self-Supervised Audio-Visual Co-Segmentation" IEEE International Conference on Acoustics, Speech and Signal Processing (ICASSP), XP033565007, DOI: 10.109/ICASSP.2019.8682467, May 12, 2019, pp. 2357-2361, 6 Pages.

* cited by examiner

METHOD AND SYSTEM FOR CREATING BINAURAL IMMERSIVE AUDIO FOR AN AUDIOVISUAL CONTENT

TECHNICAL FIELD

The present disclosure relates generally to the field of audio and video processing, more specifically to the field of processing audio track of audiovisual content based on analysis of the video content.

BACKGROUND

Audio in audiovisual content (NV) (i.e. all kind of digital audiovisual and virtual content including video/picture and audio), recorded with audio-video recording device (e.g. smartphone, tablet, smartwatch, laptop, smartTV, smart camera, handheld/wearable computing device) having only one microphone, does not provide spatial information to the user. The user (e.g. listener, viewer, customer having audio-visual content receiving and displaying device, for example smartphone, tablet, smartwatch, laptop, smartTV, smart camera, handheld/wearable computing device) is unable to identify the location of the sound sources in the recorded 3D space, if those are not displayed visually, or if that visual content is not presented at all or it is not visible with actual visual perspective. At the end, the user is not able to fully enjoy the sound experience, and this breaks the immersion (i.e. the rate of similarity between the real and the virtual/audiovisual experience) feeling.

Watching videos through the internet via video sharing platforms has become very popular, and it is very common to view TV series and movies via broadcasting and streaming services like Netflix, HBO, YLE and Twitch. Every single day, over 10 billion videos are watched, and every hour hundreds of hours of new video material are uploaded to the internet. Consumers and creators of those videos want to receive and offer more immersive and realistic audio experience. Immersive audio (i.e. 3D-audio) is a key element for this change.

The producer or broadcasting service providers, i.e. the potential buyers or licensers of the solution, need new ways to provide more realistic and immersive experience without adding extra costs or computational time.

Current solutions are too slow and expensive for companies like YouTube®, Facebook®, WhatsApp®, Netflix®, Vimeo®, Amazon®, Microsoft® and for anyone, who produces and shares recorded audiovisual content, or the user who receives and watches the material. Both parties, the content provider and the user, demand more immersive experience in the broadcasted audio-visual material, massively displayed everyday over typical equipment, e.g. mobile phones or laptops.

It is generally known, that the most important 3D-audio rendering platforms for cinema concentrate on systems where listening occurs with multi-speaker systems instead of headphones. As an example, Dolby® products and other solutions for audio and video processing and reproduction are highly priced, especially at pro-level, so there is an opportunity for new and affordable solutions to reach the movie producers and cinemas from all around the world.

The known audio and video processing tools have a common drawback. The quality related to the truthfulness of the experience has not been scientifically validated with adequate subjective listening methods.

The second problem of existing solutions, which impairs worldwide spreading of technology, is that it typically includes a lot of settings and parameters that are poorly documented. The user or producer does neither really know how they affect the final product, nor what their weight and importance is. As previously mentioned, standards and working protocols are not really available. The complex architecture, the significant setup cost, and the absence of standard distribution format and playback configuration are the biggest problems of known solutions.

The process of providing 3D audio to the final user demands that the system makes the recordings more sophisticated than a one-microphone system, which does not provide spatial information to the user, or that some hand-crafted post-processing work is done afterwards by a professional editor with some editing software. So far, no known solutions would enable to automize the process.

Several systems and methods are known from prior art. Known systems requires multiple cameras, microphones and sound resources for recording video scene to create immersive effect. Known systems do not apply object recognition from the video. Using the known solutions, the user is not able to identify the location of sound source and match the location of sound and location of visual object creating corresponding sound.

The current solutions are too slow, low quality, expensive and do not provide immersive, realistic, high quality experience to the user. The known solutions have a complex architecture, a lot of settings and parameters and are poorly documented. Therefore, the producers do not know, how these settings affect the final product.

Therefore, considering the problems known from prior art, there exists a need to overcome the aforementioned drawbacks of creating immerse audio for audiovisual content and to provide cost-effective, high-quality and well-documented solutions so, that the users could enjoy immersive and realistic experience.

SUMMARY

The aim of the present disclosure is to provide a high quality, inexpensive post-recording or post-production method and system to automatically match the location of the sound and the location of the object creating the corresponding sound in the video.

The aim of the disclosure is achieved by a method of operating a data-processing system for creating binaural immersive audio for at least one audiovisual content comprising a video and an audio and by a data-processing system configured to perform the method. The method comprises steps of receiving the video and the audio;
selecting at least one frame of the video;
analyzing the at least one selected frame of the video to identify at least one audio contributing object within the at least one frame;
selecting at least one portion of the audio;
analyzing the selected at least one portion of the audio to extract at least one audio pattern of the selected at least one portion of the audio;
associating the at least one extracted audio pattern with the identified at least one audio contributing object within the at least one selected frame;
using the association to generate the binaural audio for the at least one frame of the video.

The advantage of the present disclosure is to provide affordable automated solution to anyone who produces, shares and consumes recorded audiovisual content, which can be applied to billions of hours of audiovisual material in a cost-effective way by avoiding human editing or other post-processing actions. The present disclosure enables the user to identify the location of sound source of an audiovisual content, and thereby provides to the user a more realistic immersive audio experience.

According to the present disclosure, processing the audio track of audiovisual content is based on analysis of the video content. The present disclosure enables to calculate the location of the sound sources in recorded audiovisual content, which is recorded with the one-microphone system, and to modify that mono or one-channel audio file into a binaural (i.e. that it is sensory heard/listened in the real world) 3D format in real time. As an advantage of the disclosure, this provides to the user a more immersive experience than prior art solutions, with guaranteed added value.

The further advantage of the disclosure is, that the quality of the videos is improved automatically and it does not require input actions from the producers, editors or final users of that content.

The disclosure is of interest on use cases, where audiovisual content is recorded, post-processed, shared, broadcasted, streamed, and finally displayed by any physical hardware device.

BRIEF DESCRIPTION OF THE DRAWINGS

Embodiments of the present disclosure will now be described, by way of example only, with reference to the following diagrams wherein.

DETAILED DESCRIPTION OF EMBODIMENTS

Figure 1:
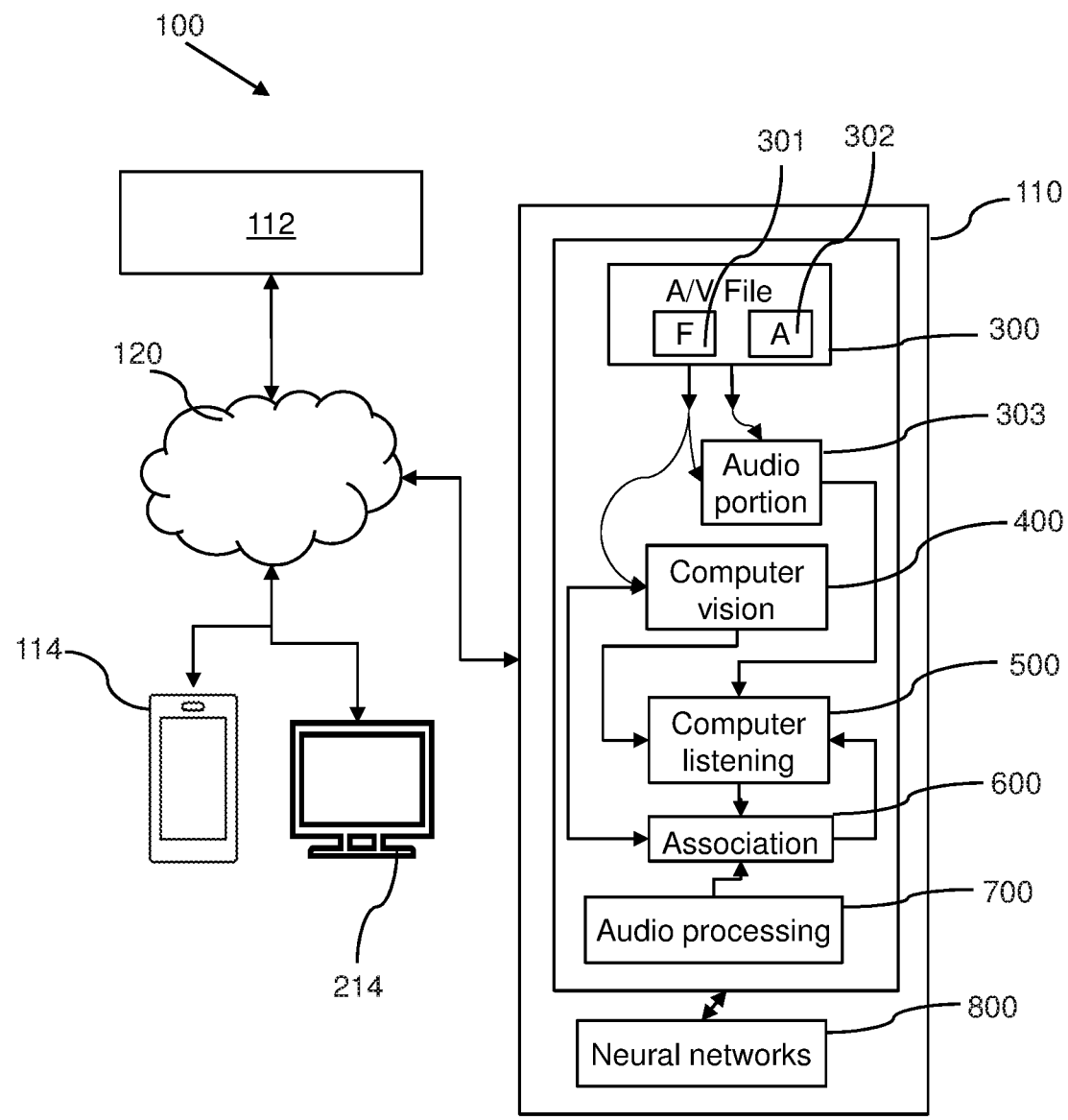
FIG. 1 is a schematic illustration of a system according to an embodiment of the present disclosure.

The following detailed description illustrates embodiments of the present disclosure and ways in which they can be implemented. Known solutions enable to identify object and non-object elements of the video, and to process pre-recorded audiovisual content having mono or one-channel audio, which is recorded with a device having one-microphone, and which is streamed or broadcasted online to user's device, to provide to the user immersive and realistic experience.

According to one embodiment, the present disclosure provides a method for creating binaural immersive audio for at least one audiovisual content comprising a video and an audio. Audiovisual content can be any content which comprises a video and an audio which can be provided for a user for consumption. The video and the audio are typically time synchronized with each other. Binaural immersive audio is an audio experience in which the user feels that the audio has 3D spatial nature i.e. sound coming from certain directions of the video are perceived by the user to come from the said direction.

A video content comprises several consequence frames. As an example, there can be 24 frames per each second of the video. Frame rate varies depending on the audiovisual content. According to the method at least one of the frames within the video is selected. The selected frame can be from an arbitrary point of the video content. The at least one selected frame of the video is analyzed to identify at least one audio contributing object within the at least one frame. An audio contributing object is an object which can be associated with an audio. One example of such of an object can be for example a car, a human, an animal, a waterfall, a machine etc. i.e. any object which might generate sound.

Further at least one portion of the audio is selected. The at least one portion of the audio is selected to comprise at least some audio which would be played at the same time as the selected at least one frame would be played during consumption of audiovisual content. Since audio sample speed can be for example 44 kHz, the selected audio portion for a single video frame (in case of 24 frames per second) would have a duration of about 42 ms (milliseconds). The selected at least one portion of the audio is analyzed to extract at least one of audio pattern of the selected at least one portion of the audio. An audio pattern refers to for example audio originating from a human speech, from a machine etc. Extraction refers to separating the audio patterns from the at least one portion of the audio as separated audio files or libraries.

Further, the at least one extracted audio pattern is associated with the identified at least one audio contributing object within the at least one selected frame. By using the associated audio pattern and audio contributing object, the binaural immersive audio for the at least one frame of the video is generated.

According to an additional embodiment of the present disclosure the analyzing at least one selected frame of the video comprises steps of:

performing a video recognition process for the at least one selected frame of the video by using computer vision;

calculating the spatial location coordinates of audio contributing object; and classifying audio contributing object and the spatial location coordinates by using at least one convolutional neural network.

Video recognition process enables finding the audio contributing objects in an automatic manner. Spatial location co-ordinates refer to where x,y co-ordinate of a single frame the audio appears to come from.

Additionally, the method of operating a data-processing system for creating binaural immersive audio for at least one audiovisual content comprising a video and an audio (e.g. one-channel audio or multi-channel audio) and by a data-processing system configured to perform the method is provided.

The method and system for creating binaural immersive audio for the audiovisual content calculates the location of the sound sources in a frame of an audiovisual content and modifies audio of the audiovisual file into binaural and 3D format.

In one embodiment, the system comprises at least one server connectable to at least one audiovisual content provider (e.g. broadcasting or streaming service provider or user having audio-video recording device). The server is configured to receive the audiovisual content having 2D audio from the audiovisual content provider.

The server is configured to create the binaural immersive audio to the video by dividing the received audiovisual content into audio portions and frames, to process the divided audio and frames, to associate the processed audio and processed frames and to send the associated audio and frames as a single audiovisual content having binaural immersive audio to audiovisual content receiver (e.g. broadcasting or streaming service provider or user's device).

The server typically comprises at least one database; a video analysis module configured to perform a video recognition process of the received audiovisual content; an audio analysis module configured to perform an audio recognition process of the received audiovisual content; an association module configured to perform association of recognized video and recognized audio of the audiovisual content; an audio processing module configured to spatialize the audio chunks to match the locations of the visual and non-visual audio contributing objects at the post-production phase; and at least two neural networks (e.g. convolutional neural network).

At the post-production phase spatializing the audio chunks to match the locations of the audio contributing objects is carried out, once the audiovisual content (e.g. movie) has been already created, for instance with a mobile phone. The result is a clear improvement of the audio content because location of audio and audio contributing objects match. The user feels that each audible and identifiable sound comes from exact location or object.

The neural network is configured to handle the audio pattern databases, and to coordinate the process between the video recognition process and audio recognition process and implement the computer vision system by sending the frames of the video of audiovisual content through the neural network.

The computer vision module comprises a computer vision system configured to perform a visual object recognition process of the received audiovisual content and an image pattern database configured to store the results of the visual object recognition.

The computer listening module comprises a computer listening system configured to break down the complete audio samples of the recognized audiovisual content into individual audio chunks to identify sounds in each audio sample and at least one audio pattern database comprising sound pattern libraries of identified sound patterns.

The method according to an embodiment sets the format of the audio information in such way that both parts, visible and audible contents, match to each other.

In an alternative or additional embodiment of the present disclosure the analyzing at least one selected frame of the video further comprises steps of:
sharpening of the at least one frame for distortion removal;
making a region proposal for the at least one audio contributing object using the spatial region co-ordinates;
determining a relative 3D position of the at least one audio contributing object and using at least one; convolutional neural network to make the region proposal and to determine the relative 3D position.

In one or more embodiments the analyzing the selected at least one portion of the audio to extract audio pattern comprises steps of:
performing an audio recognition process of the selected at least one portion of the audio by computer listening to identify audio patterns;
breaking down the identified audio patterns into at least one individual audio chunk by computer listening to identify sounds in the at least one audio pattern;
classifying the identified sounds of the at least one audio chunk by using at least one convolutional neural network;
creating a sound pattern library of at least one classified audio chunk and storing it in an audio pattern database;
using the created sound pattern library as extracted audio patterns.

In one embodiment the associating at least one extracted audio pattern with the at least one audio contributing object comprises steps of:
searching the association between information of the at least one audio pattern and the at least one frame by applying at least one of a convolutional neural network or machine learning method to identify which audio chunk in the sound pattern library matches the identified audio contribution object;
using the correlations as the association.

In one or more embodiments, the convolutional neural network is one of a region convolutional neural network, a map convolutional neural network or a deep convolutional neural network.

In an additional or alternative embodiment, the audiovisual content is received from at least one audiovisual content provider (such as a content providers' server system) or at least one audiovisual recording device (e.g. smartphone, tablet, smartwatch, laptop, smart TV, smart camera, handheld/wearable computing device). The audiovisual content can be received real time or close to real time when it is created or it can be received from a content storage. The audiovisual content provided can be for example broadcasting or streaming service provider.

According to alternative embodiment the audio of the audiovisual content is one of one-channel audio or multi-channel audio. Indeed, the method can improve quality one-channel by creating immersive experience. Furthermore, if original audio is multi-channel, then each audible component has a separate audio channel and each channel identifies with one visual component.

In the phase of video analysis according to an embodiment of the present disclosure a library of image patterns on the frames of the received audiovisual content is created. During the video analysis, each recognized image pattern is identified and categorized and stored to corresponding image pattern database comprising information of category, number of frames and location on xy-coordinates.

In an example embodiment of the present disclosure the image pattern database comprises at least one of ID of the each recognized, identified, classified images on the frames; ID of an audio object on the corresponding audio pattern database, wherein the audio ID is updated when an image and the audio are identified to belong to the same object; categories of recognized objects on each frame (for example human, nature, machines) and type of each object (for example male/female, trees/birds/mammals, small/big vehicle, etc.); frame numbers; and location coordinates of each audio contributing object on each frame.

Additionally, each image pattern stored in image pattern database may comprise also a reference to the sound pattern in corresponding audio pattern database. The reference to sound pattern is evaluated in the phase of performing association of the results of video analysis and audio analysis.

The frames of the video of audiovisual content may be sent from image pattern database to the association module through two convolutional neural networks (CNN). The first neural network is for example a region convolutional neural network (region-CNN) configured to find and labels the images of the audio contributing objects on the frame, make a region proposal, and decide what region to associate for searched objects.

The second neural network is for example a depth map convolutional neural network (depth map-CNN) which is configured to determine its relative 3D position, e.g. distance from the point of view.

In an embodiment of the present disclosure, the video analysis comprises sharpening of image for distortion removal, region-CNN for region proposal, and depth map-CNN for scene understanding.

The audio contributing objects on the frame may be analyzed by the region-CNN and separated depending on the classes e.g. cars, persons, buildings, birds, etc. according to the shapes of the audio contributing objects on the frame. The depth map-CNN parametrizes each object e.g. location, movement vector and distance with respect to the user. Buildings and objects which do not produce sound themselves are also analyzed because of their sound reflection properties.

In the phase of audio analysis according to an embodiment the present disclosure a library of audio patterns of the audio chunks of the received audiovisual content is created.

During the audio analysis, each recognized audio chunk is identified, categorized and stored to corresponding audio pattern database comprising ID, information of category and type of the sound, number of start frame and number of end frame. Each audio chunk represents a sound category and sound type of audio contributing object elements (e.g. an example of object element of audio is a car with motor running) and non-object elements (e.g. an example of non-object audio element is howling wind (which is not visible)), e.g. category N sounds with a nature character (type e.g. birds, animals, wind), category S with sound made by male and female voices (type e.g. speech), and category M for machines (type e.g. vehicles) or other type of sounds produced by human activities (e.g. footsteps). The sound pattern libraries may be updated in real time.

In the phase of sound analysis according to an embodiment of the present disclosure the system reads the sound sample of the audio from the received audiovisual content and identifies the category and the type of the sound of each frame of the video. Based on the identified sounds the system creates sound pattern libraries. Each sound pattern library is stored to the audio pattern database with ID, type identifier and start and end frame.

In an embodiment of the present disclosure the audio analysis is carried out by automatic sound source identification by computer listening. During the audio analysis the sounds present on the audio digital file are identified, extracted from the original audiovisual content file, and separated into individual channels on a temporal and different audio format. This process is called decomposition. In the decomposition a Short Time Fourier Transform (STFT) is used to break a large audio file into smaller audio chunks. The audio chunks are then sent through a convolutional neural network that is configured to decode the STFT into a format that the neural network can understand. The convolutional neural network applies the same encoding system of the original audio wave file into the encoding of each new series of wave corresponding for each identified individual sound.

The present invention is based on that different sounds have different physical properties, e.g. female and male speech have different spectral characteristics, as well that there are several differences between the sounds of for example a car, a motorbike, a truck, a helicopter, even though all are produced by mechanical engines. The properties of the original audio file are analyzed and the sounds are separated in classes based on the decomposition and identification of spectral components and acoustic parameters. The amount of sounds within a movie or game might be in the order of thousands, but the present invention considers that at any time only few sounds are played simultaneously, and that both sets of information, visual and audible, would match.

Recursively iteration process and machine learning assist on applying the information obtained in a certain frame to the next ones. In other words, multiple sounds might be present simultaneously, but in case of conflict, e.g. two persons present but only one speaking, the present disclosure makes use of previous and of future data to decide which one of the two persons is talking.

In an embodiment of the present disclosure, the one-channel audio file includes several sounds, e.g. it is a messed audio file. Messed audio file is broken into a multi-channel audio file, where each audio file includes one sound source. The strategy here is to analyze messed audio files by deep convolutional neural networks and machine learning. This will improve the efficiency on the sound source identification process. In other words, the more times the present system identifies different voices, the better it will behave when needing to identify many people talking simultaneously.

According to an embodiment, the audio analysis comprises following steps. In order to analyze the audio file and find patterns and physical characteristics, the metrics are developed. The physical characteristics to analyze are frequency content type, and single number quantities like amplitude modulation, tonality, roughness, and sharpness. Then the separation of audio contributing objects is implemented by using deep convolutional neural networks. Then a machine learning process is carried out by which the present disclosure becomes more effective and accurate the more data is analyzed.

In an embodiment, the image pattern database is fully constructed before searching the link between audio contributing object and the frame. This enables to use maximum information to find out the best match between the frames and the audio patterns. Additionally, other mechanisms like Doppler, mouth movement, frequency attenuation are used to identify link between certain image pattern and audio pattern.

The implementation of immersive audio into already existing digital audiovisual content is carried out autonomously and automatically by analyzing the video and audio of the audiovisual content and performing the process so that both contents match to each other. The association is determined with machine learning analysis. The final content feels to the final user as more realistic and immersive than before the processing the originally streamed or broadcasted audiovisual content or the originally recorded video felt.

According to an additional embodiment a data-processing system for creating binaural immersive audio for an audiovisual content is provided. The data-processing system is configured to execute any of the methods discussed in this disclosure.

According to an additional embodiment of the present disclosure, wherein the audiovisual content is pre-processed, the user creates an audiovisual content by using audio-video recording device and uploads over the network the recorded audiovisual content to server of broadcasting or streaming service provider. The server of the present disclosure processes 2D audio of the recorded audiovisual content and creates a binaural immersive audio for that audiovisual content, which is further uploaded and stored in the server of broadcasting or streaming service provider. No further post-processing is needed as the processed audiovisual content is stored in the server of broadcasting or streaming service provider (e.g. YouTube®, Facebook®, Vimeo®)

According to another embodiment of the present disclosure, wherein the audiovisual content is post-processed the user has created an audiovisual content by using audio-video recording device (e.g. smartphone, tablet, smartwatch, laptop, smart TV, smart camera, handheld/wearable computing device) and uploaded the recorded audiovisual content directly to the server of broadcasting or streaming service provider (e.g. YouTube®, Facebook®, Vimeo®). The server of the present disclosure post-processes 2D audio of the recorded audiovisual content and creates a binaural immersive audio for that audiovisual content. The-post-processed audiovisual content is transferred to the user's device over the internet and displayed on the display of the user's device. The post-processing is carried out continuously when the audiovisual content is requested from the server of broadcasting or streaming service provider.

In another embodiment of the present disclosure, the post-processed audiovisual content is stored in the server of broadcasting or streaming service provider. When the same audiovisual content is requested again, no post-processing is needed anymore.

DETAILED DESCRIPTION OF THE DRAWINGS

FIG. 1 is a schematic illustration of an exemplary embodiment of a system 100 according to the present disclosure. The system 100 comprises a server 110 connected to an audiovisual content provider 112 via a communication network 120. The server 110 can be also connected to an audio-video recording device 114 via the communication network. The server 110 can be also connected to an user device 214 via the communication network. The audio-video recording device 114 can provide recorded audiovisual content to the audiovisual content provider via a communication network 120.

The server 110 is configured to receive the audiovisual content 300 from the audio-video recording device 114 and/or from the audiovisual content provider 112. The audiovisual content 300 comprises video frames 301 and audio 302. The server 110 is configured to create a binaural immersive audio to the video 302 of audiovisual content 300. The server 110 is further configured to divide the received audiovisual content into audio 302 and frames 301, to select an audio portion 303 from the audio 302, to process the audio portion 303 of divided audio 302 and frames 301, to associate the processed audio with the processed frames and to send the associated audio and frames as a single audiovisual content having binaural immersive audio to audiovisual content receiver (e.g. broadcasting or streaming service provider 112 or user's device 114, 214).

The server 110 comprises a computer vision module 400 configured to perform a video recognition process of the received audiovisual content; a computer listening module 500 configured to perform an audio recognition process of the received audiovisual content; an association module 600 configured to perform association of recognized video and recognized audio of the audiovisual content 300; an audio processing module 700 configured to spatialize the audio chunks to match the location coordinates of the audio contributing objects; at least two neural networks 800 (e.g. convolutional neural network).

Figure 3:
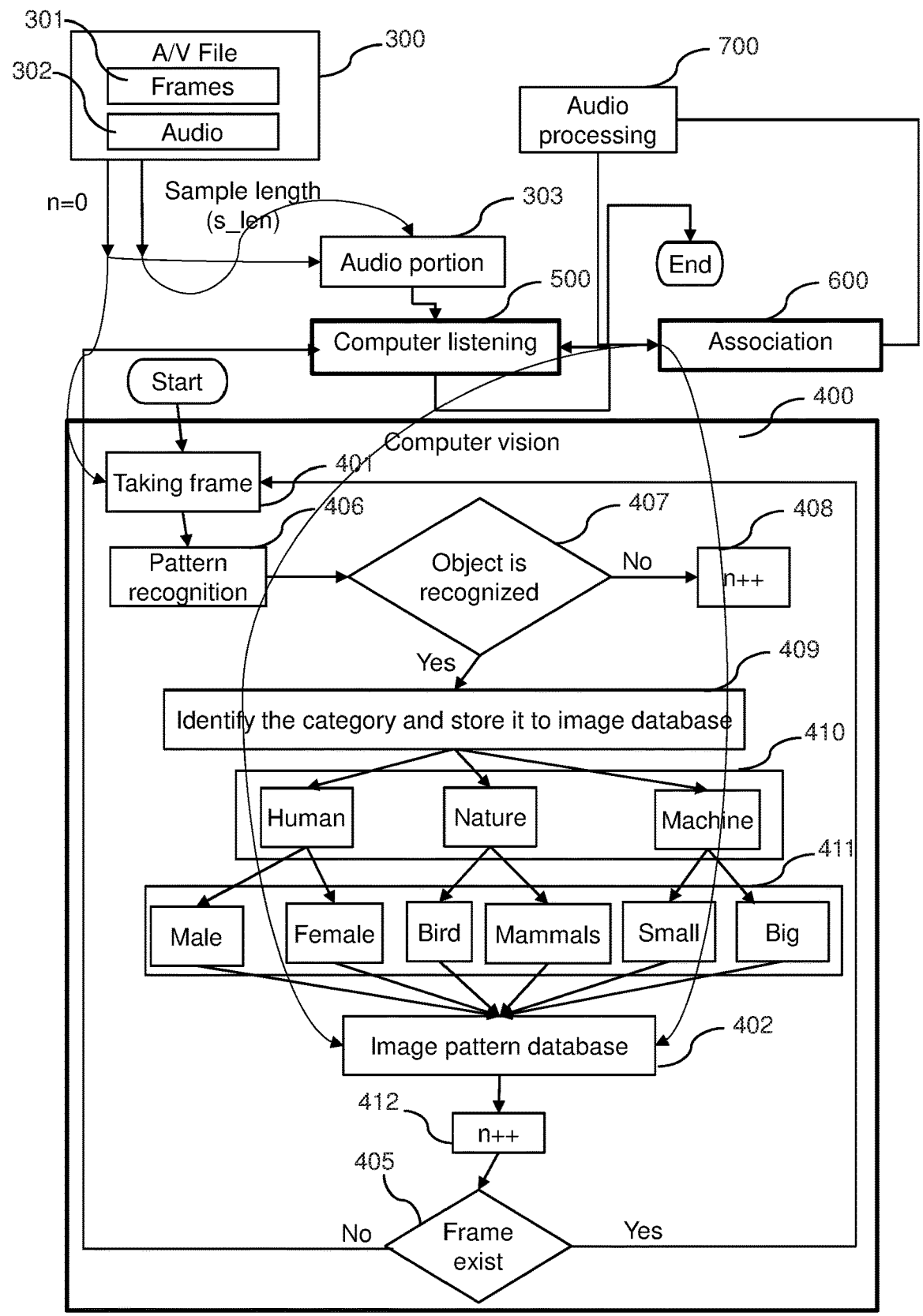
FIG. 3 is a block scheme of a method according to an embodiment of the present disclosure illustrating steps of video analysis of the method.

The computer vision module 400 is described in detail in FIG. 3. The computer listening module 500 is described in detail in FIG. 4. The association module 600 is described in detail in FIG. 5.

Figure 2A:
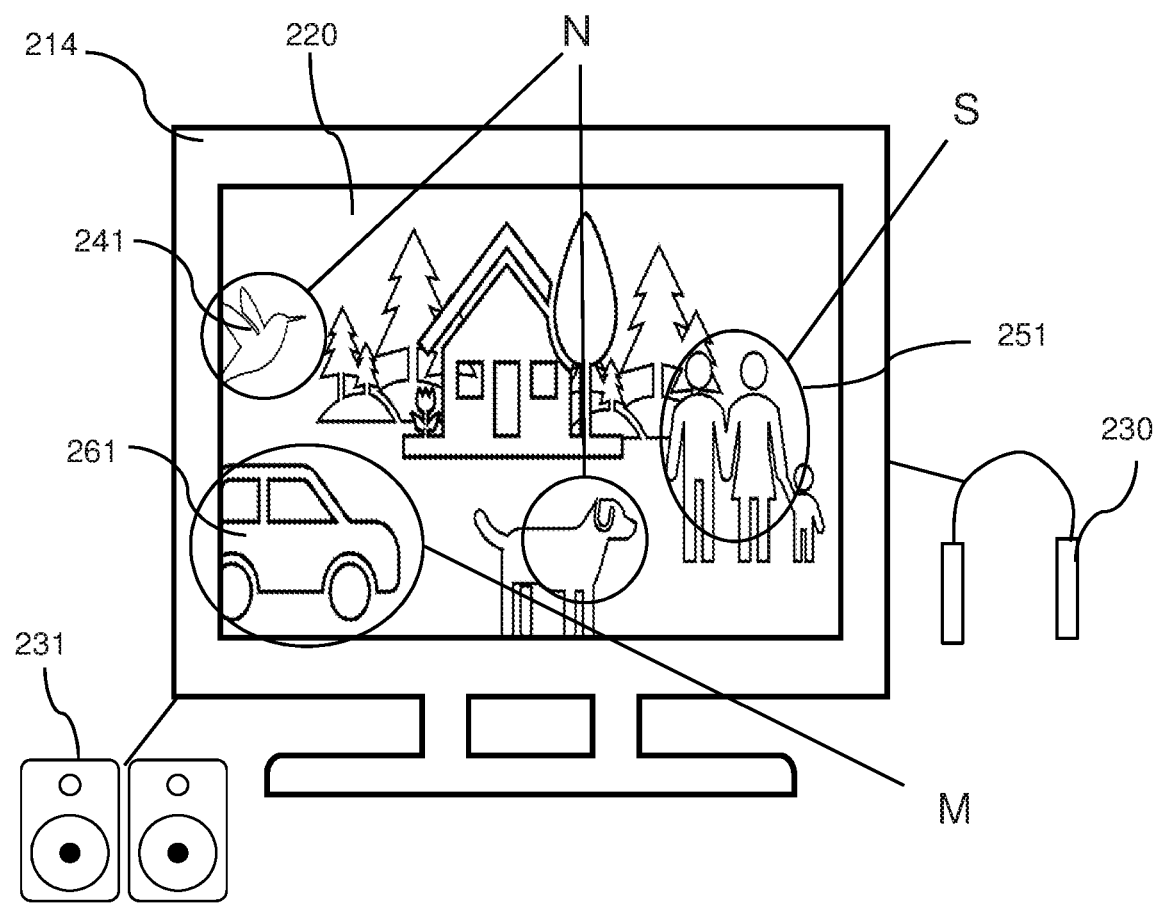
FIG. 2a illustrates a real situation according to an embodiment of the present disclosure, where user watches a digital audiovisual content broadcasted by the internet in mobile devices, e.g. a smartphone, TV, laptop, tablet.

FIG. 2a. is an illustration of a user device 214 configured for consumption of audiovisual content for which binaural immerse audio is generated. Binaural immersive audio is defined as a sound on a digital form that feels on human ears as fully realistic. The purpose of binaural immersive audio is to convert the displayed audiovisual content into a more realistic experience. The user device 214 comprises a display 220 for rendering video of the audiovisual content. The user watches a processed digital audiovisual content broadcasted by the internet on the display 220 of the device 214. In the FIG. 2a rendered audio generating objects 241, 261 and 251 are illustrated. A set of headphones 230 or speakers 231 are connected to the user device 214. The headphones 230 provide the binaural immersive audio of the rendered video for the user. The desired immersive and enjoyable experience is presented, where both sounds and images match perfectly.

Figure 2B:
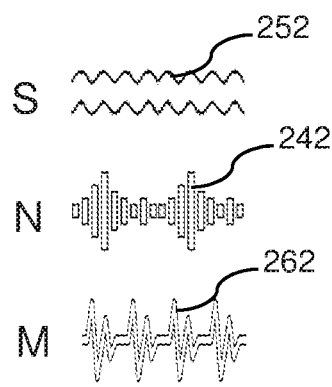
FIG. 2b illustrates examples of extracted audio patterns according to an embodiment of the present disclosure.

FIG. 2b is a schematic illustration of extracted audio patterns 252, 242, 262 which are related to the rendered video on the screen 220. The audio pattern 252 is associated with human objects 251 i.e. the audio pattern 252 thus appears to originate spatially from said area (or the location coordinates) of the display. The audio pattern 242 is associated with animal objects 241 i.e. the audio pattern 242 thus appears to originate spatially from said area (or the location coordinates) of the display. The audio pattern 262 is associated with machine objects 261 i.e. the audio pattern 262 thus appears to originate spatially from said area (or the location coordinates) of the display.

FIG. 3 is a block scheme of a method according to an embodiment of the present disclosure illustrating steps of video analysis of the method. Video frames 301 are received by computer vision module 400 of the server 110. A frame n is selected from the received video frames with frame selection module 401. The selected frame n is analyzed using neural network and machine learning based pattern recognition object recognition module 406, 407 respectively. If no audio contributing objects are detected then next frame is processed 408 (n++). If an audio contributing object is identified 409, then the audio contributing object is classified by category 410 and type 411 and stored in an image pattern database 402. Identification has two steps 410 to identify audio contributing object by category 410 (e.g. human, nature, machines) and then in more detailed level by type 411 (e.g. female, male; bird, mammal; small, big etc.) of each category. The identified patterns of audio contributing objects are stored in the image pattern database 402. Frame index n is updated in step 412 (n++). If there are more frames to be analyzed 405 then process is taken to module 401 and repeated until all the frames of the video are processed. If all frames are processed then audio analysis module 500 of running in the server 110 is used.

Figure 4:
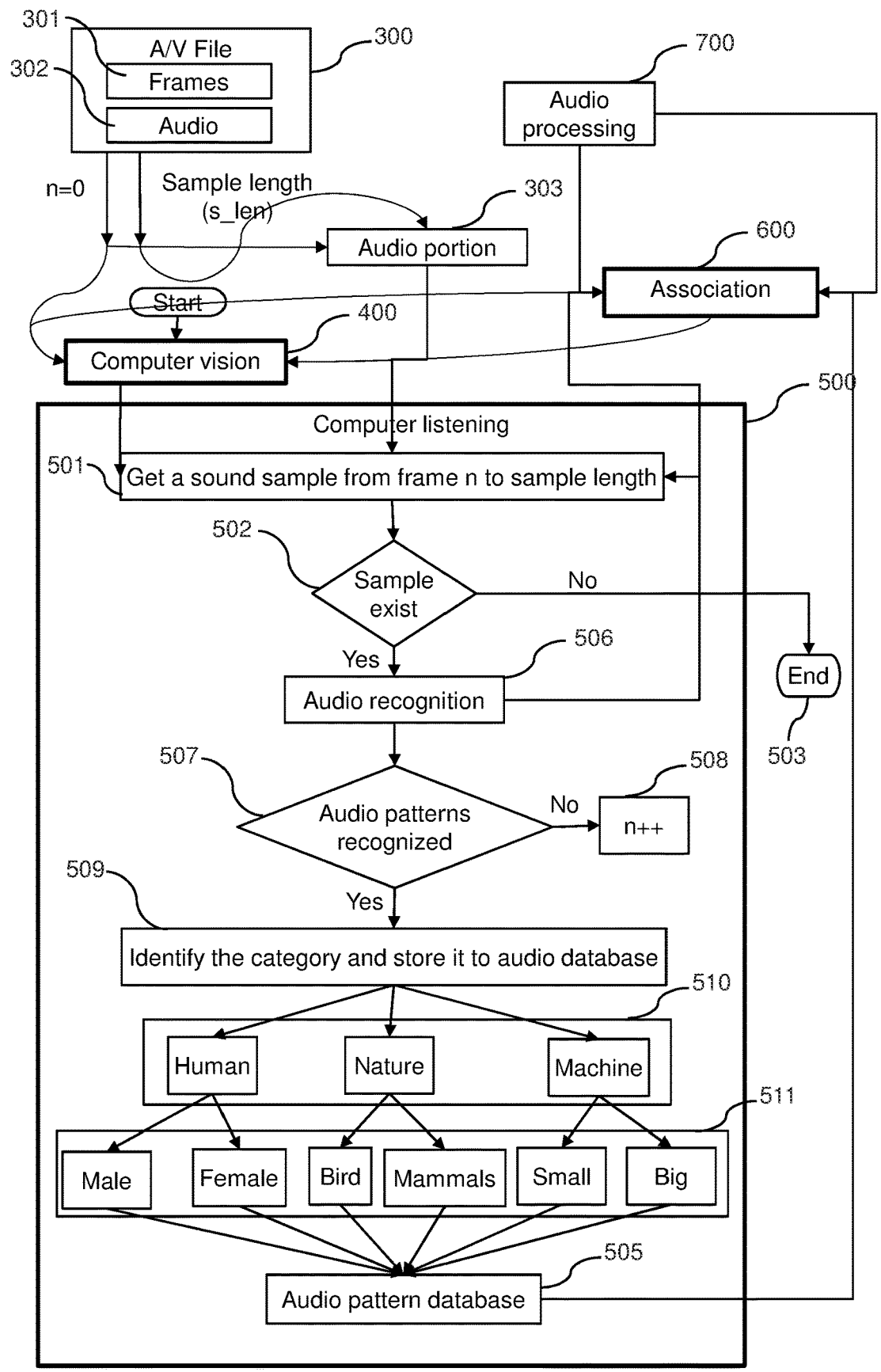
FIG. 4 is a block scheme of a method according to an embodiment of the present disclosure illustrating steps of audio analysis of the method.

FIG. 4 is a block scheme of a method according to an embodiment of the present disclosure illustrating steps of audio analysis of the method. An audio portion 303 of the audio 302 of audiovisual content 300 is received by computer listening module 500 of the server 110. A sound sample from frame n to sample length is selected from the received audio portion with the sound sample selection module 501. In the next step, whether there are more audio portions to analyze 502 is checked. If no audio portions in corresponding frames exist, the audio analysis of the received audiovisual content is ended by the server 110 in step 503. The selected sound sample from frame n to sample length is analyzed using neural network and machine learning based audio recognition 506 and audio pattern recognition 507 module. If no audio patterns on corresponding frame are detected then next frame is processed 508 (n++). If audio pattern is recognized 507, then the audio pattern is classified 509 by category 510 (e.g. human, nature, machines) and type 511 (e.g. female, male; bird, mammal; small, big etc.) and stored in an audio pattern database 505. The audio pattern having id=1+n 601 is then sent from audio pattern database 505 to association module 600.

Figure 5:
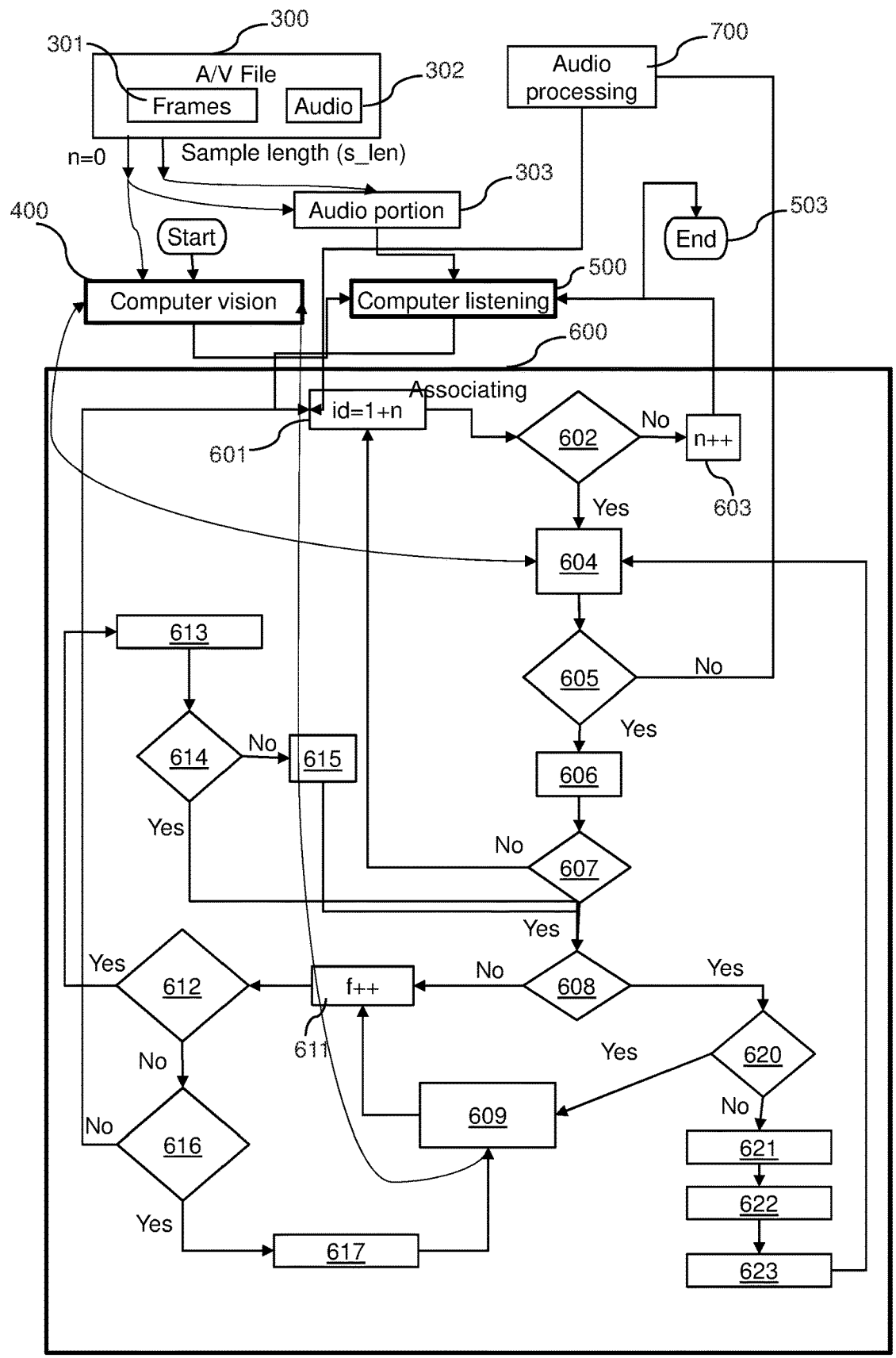
FIG. 5 is a block scheme of a method according to an embodiment of the present disclosure illustrating steps of associating of the results of video and audio analysis of the method.

FIG. 5 is a block scheme of a method according to an embodiment of the present disclosure illustrating steps of association of the results of video and audio analysis of the method.

An analyzed audio pattern with Id=1+n 601 is received from the audio pattern database 505 in an association module 600 of the server 110, wherein n is the counter for audio pattern and each audio pattern has a duration from the start frame to the end frame. Are there any audio patterns left is checked 602. If no audio patterns on corresponding frame are detected, then next frame is processed 603 (n++). If audio pattern is detected, then a search of the same type of audio contributing object from the image pattern database from the location=start_frame+f (I.e. if the audio pattern type is a "car", search is there is also the image pattern type "car". In the first round f=0, so the target frame is the same as the beginning of the sound sample (start frame)) is performed 604. Are there any frames left is checked 605. If there are no frames left, then the whole video is processed. If there are more frames left, additional identification is performed 606, to additional information for identifying the link between the audio and the image, by using for example Doppler effect, Mouth movement, Frequency attenuation identification methods. Whether the audio pattern type and the image pattern type match is checked 607. If there is no match, then the next audio pattern with id=1+n from the audio pattern database 505 is received 601. If the match is detected, then it is checked, if there is multiple same type of image patterns 608. If there are no multiple same type of image patterns, then the frame counter f to process the next frame is incremented 611 (f++) considering f<f_required OR no frames left (i.e. f_required: Variable for minimum amount of frames what are needed to process for recognizing the image-audio pattern association) 612. If the image pattern gradually changes between the frames, the object is identified as the same object, the next is read, i.e. frame=start frame+f from the image pattern database 613. Is the image pattern the same as on the previous frame is checked 614. If no, then the check if specific image pattern has disappeared from this frame is incremented 615 and then it is checked, if there is multiple same type of image patterns 608. If it is detected, that the image pattern is the same as on the previous frame, then it is checked, if there is multiple same type of image patterns 608. If it is detected, that there is multiple same type of image patterns, then it is checked, if all the image patterns have the sound ID OR all the image patterns on that frame are processed k=>j (When there are multiple same type of image patterns, it is necessary to search also previously gathered data from the image pattern database, i.e. for example more people are coming to the same scene and some people/sound patterns are already identified on previous frames) 620. If yes, then the match between image and sound pattern has been found and image pattern database is updated 609.

Additionally, in step 612 to ensure that the identification process is performed reliable, it is checked the value of the limit how many frames without unsuccessful identification can happen, if the value does not correspond to the set limit 616, the next audio pattern with id=1+n from the audio pattern database 505 is received 601. If the value corresponds to the set limit 617 (i.e. f_required=0; max_error=0), then the match between image and sound pattern has been found and image pattern database is updated 609.

If in step 620 it is detected, that all the image patterns do not have the sound ID OR All the image patterns on that frame are not processed, then image patterns which doesn't have audio pattern ID value (i.e. are not yet linked with an audio patterns) are selected 621 and these image patterns are processed to recognize possible source of the audio pattern 622 by search of the same type of audio contributing object from the image pattern database from the location and receiving the pattern 1+k 623.

Figure 6:
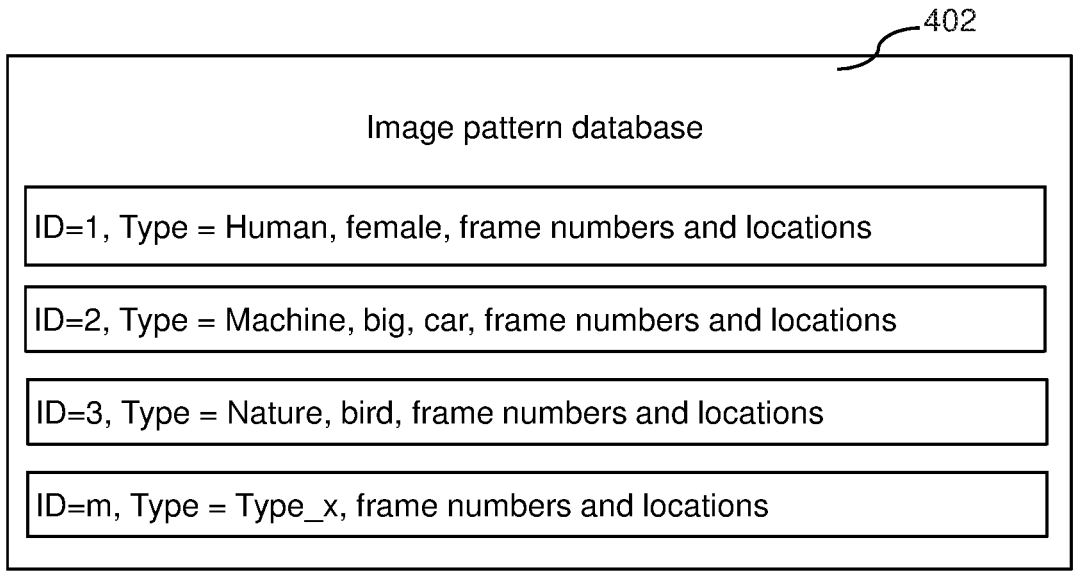
FIG. 6 illustrates an example structure of an image pattern database of the system according to an embodiment of the present disclosure illustrating steps of association of the results of video and audio analysis of the method.

FIG. 6 illustrates the example structure of an image pattern database 402 of the system according to an embodiment of the present disclosure, wherein the image pattern database comprises frames having ID of the audiovisual content, information of detected audio contributing objects on each frame classified by categories and types of the corresponding audio contributing objects, location coordinates of the audio contributing objects on corresponding frames and frame numbers, wherein the corresponding audio contributing objects appear.

Figure 7:
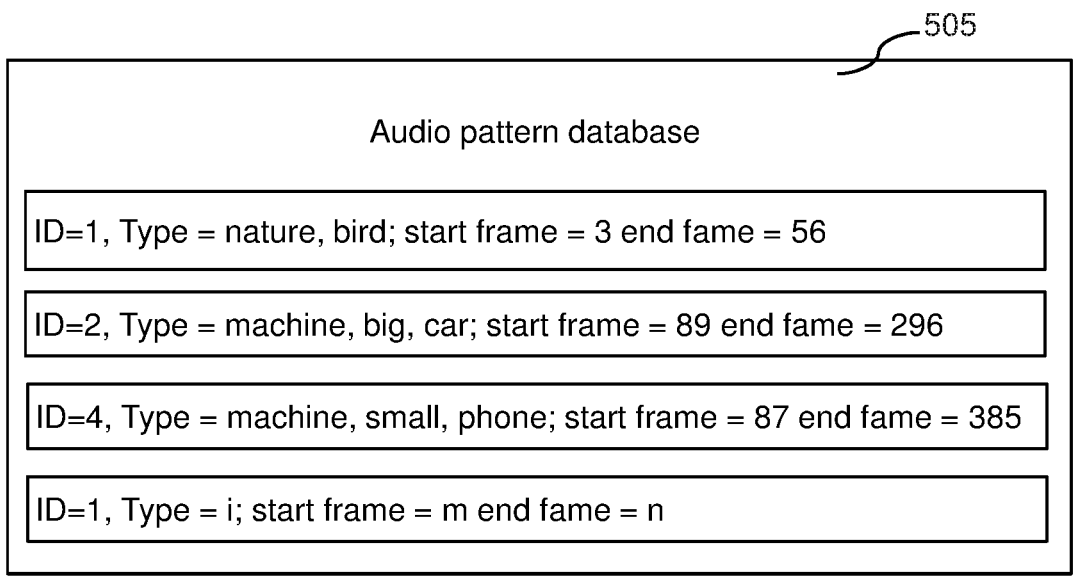
FIG. 7 illustrates an example structure of an audio pattern database of the system according to an embodiment of the present disclosure.

FIG. 7 illustrates the example structure of an audio pattern database 505 of the system according to an embodiment of the present disclosure, wherein the audio pattern database comprises recognized audio patterns having ID of the audiovisual content, number of the start frame and end frame of each audio pattern and information of the category and type of each audio pattern.

The invention claimed is:

1. A method for creating binaural immersive audio for at least one audiovisual content comprising a video and an audio, the method comprising receiving the video and the audio;
    selecting at least one frame of the video;
    analyzing the at least one selected frame of the video to identify at least one audio contributing object within the at least one frame;
    selecting at least one portion of the audio;
    analyzing the selected at least one portion of the audio to extract at least one audio pattern of the selected at least one portion of the audio by:
        performing an audio recognition process of the selected at least one portion of the audio by computer listening to identify audio patterns;
        breaking down the identified audio patterns into at least one individual audio chunk by computer listening to identify sounds in the at least one audio pattern;

classifying the identified sounds of the at least one audio chunk by using at least one convolutional neural network;

creating a sound pattern library of at least one classified audio chunk and storing it in an audio pattern database; and using the created sound pattern library as extracted audio patterns;

associating the at least one extracted audio pattern with the identified at least one audio contributing object within the at least one selected frame by:

searching a correlation between information of the at least one audio pattern and the at least one frame by applying at least one of a convolutional neural network or machine learning method to identify an audio chunk in the sound pattern library that matches the identified at least one audio contributing object;

using the correlation as the association; and using the association to generate a binaural audio for the at least one frame of the video.

2. The method according to claim 1, wherein analyzing the at least one selected frame of the video the comprises:

performing a video recognition process for the at least one selected frame of the video by using computer vision;

calculating spatial location coordinates of the at least one audio contributing object; and classifying the at least one audio contributing object and the spatial location coordinates by using at least one convolutional neural network.

3. The method according to claim 2, wherein analyzing the at least one selected frame of the video further comprises:

sharpening of the at least one frame for distortion removal;

making a region proposal for the at least one audio contributing object using the spatial location coordinates;

determining a relative 3D position of the at least one audio contributing object and using at least one convolutional neural network to make the region proposal and to determine the relative 3D position.

4. The method according to claim 1, wherein the convolutional neural network is one of a region convolutional neural network or a map convolutional neural network.

5. The method according to claim 1, wherein the audiovisual content is received from at least one audiovisual content provider or audiovisual recording device.

6. The method according to claim 1, wherein the audio of the audiovisual content is one-channel audio.

7. The method according to claim 1, wherein the audio of the audiovisual content is multi-channel audio.

8. A data-processing system for creating binaural and 3D audio for an audiovisual content configured to perform the method of claim 1.

9. A method for creating binaural immersive audio for at least one audiovisual content comprising a video and an audio, the method comprising:

receiving the video and the audio;

selecting at least one frame of the video;

analyzing the at least one selected frame of the video to identify at least one audio contributing object within the at least one frame;

selecting at least one portion of the audio;

analyzing the selected at least one portion of the audio to extract at least one audio pattern of the selected at least one portion of the audio by:

performing an audio recognition process of the selected at least one portion of the audio by computer listening to identify audio patterns;

breaking down the identified audio patterns into at least one individual audio chunk by computer listening to identify sounds in the at least one audio pattern;

classifying the identified sounds of the at least one audio chunk by using at least one convolutional neural network;

creating a sound pattern library of at least one classified audio chunk and storing it in an audio pattern database; and using the created sound pattern library as extracted audio patterns;

associating the at least one extracted audio pattern with the identified at least one audio contributing object within the at least one selected frame; and using the association to generate a binaural audio for the at least one frame of the video.

10. The method according to claim 9, wherein the audiovisual content is received from at least one audiovisual content provider or audiovisual recording device.

11. The method according to claim 9, wherein the audio of the audiovisual content is one-channel audio.

12. The method according to claim 9, wherein the audio of the audiovisual content is multi-channel audio.

13. A method for creating binaural immersive audio for at least one audiovisual content comprising a video and an audio, the method comprising:

receiving the video and the audio;

selecting at least one frame of the video;

analyzing the at least one selected frame of the video to identify at least one audio contributing object within the at least one frame by:

performing a video recognition process for the at least one selected frame of the video by using computer vision:

calculating spatial location coordinates of the at least one audio contributing object;

classifying the at least one audio contributing object and the spatial location coordinates by using at least one convolutional neural network;

sharpening the at least one frame for distortion removal;

making a region proposal for the at least one audio contributing object using the spatial location coordinates;

determining a relative 3D position of the at least one audio contributing object; and using at least one convolutional neural network to make the region proposal and to determine the relative 3D position;

selecting at least one portion of the audio;

analyzing the selected at least one portion of the audio to extract at least one audio pattern of the selected at least one portion of the audio;

associating the at least one extracted audio pattern with the identified at least one audio contributing object within the at least one selected frame; and using the association to generate a binaural audio for the at least one frame of the video.

14. The method according to claim 13, wherein analyzing the selected at least one portion of the audio to extract the at least one audio pattern comprises:

performing an audio recognition process of the selected at least one portion of the audio by computer listening to identify audio patterns;

breaking down the identified audio patterns into at least one individual audio chunk by computer listening to identify sounds in the at least one audio pattern;

classifying the identified sounds of the at least one audio chunk by using at least one convolutional neural network;

creating a sound pattern library of at least one classified audio chunk and storing it in an audio pattern database; and using the created sound pattern library as extracted audio patterns.

15. The method according to claim 14, wherein associating the at least one extracted audio pattern with the at least one audio contributing object comprises:

searching a correlation between information of the at least one audio pattern and the at least one frame by applying at least one of a convolutional neural network or machine learning method to identify an audio chunk in the sound pattern library that matches the identified audio contributing object; and using the correlation as the association.

16. The method according to claim 13, wherein the audiovisual content is received from at least one audiovisual content provider or audiovisual recording device.

17. The method according to claim 13, wherein the audio of the audiovisual content is one-channel audio.

18. The method according to claim 13, wherein the audio of the audiovisual content is multi-channel audio.

\* \* \* \* \*